United States Patent [19]

Dalmas et al.

[11] Patent Number: 5,043,989

[45] Date of Patent: Aug. 27, 1991

[54] TERMINAL ADAPTER HAVING A MULTIPLE HDLC COMMUNICATION CHANNELS RECEIVER FOR PROCESSING CONTROL NETWORK MANAGEMENT FRAMES

[75] Inventors: Philippe Dalmas, Villeneuve Loubet; Daniel Esteban, Cagnes sur Mer; Jean-Francois Le Pennec, Nice; Patrick Michel, La Gaude; Philippe Therias, Nice, all of France

[73] Assignee: International Business Machines Corp., Armonk, N.Y.

[21] Appl. No.: 401,892

[22] Filed: Sep. 1, 1989

[30] Foreign Application Priority Data

Jun. 29, 1989 [EP] European Pat. Off. ........... 89480102

[51] Int. Cl.⁵ .............................................. G06F 11/10
[52] U.S. Cl. ................................... 371/37.1; 370/58.1
[58] Field of Search ...................... 371/37.1; 370/58.1, 370/60, 94.1, 92

[56] References Cited

U.S. PATENT DOCUMENTS

| | | | |
|---|---|---|---|
| 4,507,782 | 3/1985 | Kunimasa et al. | 371/37.1 |
| 4,523,310 | 6/1985 | Brown et al. | 370/112 |
| 4,710,916 | 12/1987 | Amstutz et al. | 370/58.1 |
| 4,887,162 | 12/1989 | Arai | 371/31 |

OTHER PUBLICATIONS

Patent Abstracts of Japan, vol. 2, No. 61 (E-31), May 8, 1978; & JP-A-53 025 306 (Sanyo Denki K.K.).
Patent Abstracts of Japan, vol. 8, No. 53 (E-231), Mar. 9, 1984; & JP-A-58 206 254 (Nippon Denki K.K.).

*Primary Examiner*—Charles E. Atkinson
*Attorney, Agent, or Firm*—Edward H. Duffield

[57] ABSTRACT

A terminal adapter for a telecommunication network having a receiver for multiple HDLC communication channels. The receiver includes a BCC calculator for computing and checking the validity of a received HDLC CNM frame. The terminal adapter further includes a device for detecting the reception of a specific CNM header included in a CNM frame on any of the HDLC communication channels and responsive to the detection for setting the BCC calculator to a predefined state. The latter state corresponds to the state of the BCC calculator after a computation of BCC for the specific CNM header. Therefore the BCC calculator can proceed with computation of said BCC for the CNM frame.

5 Claims, 11 Drawing Sheets

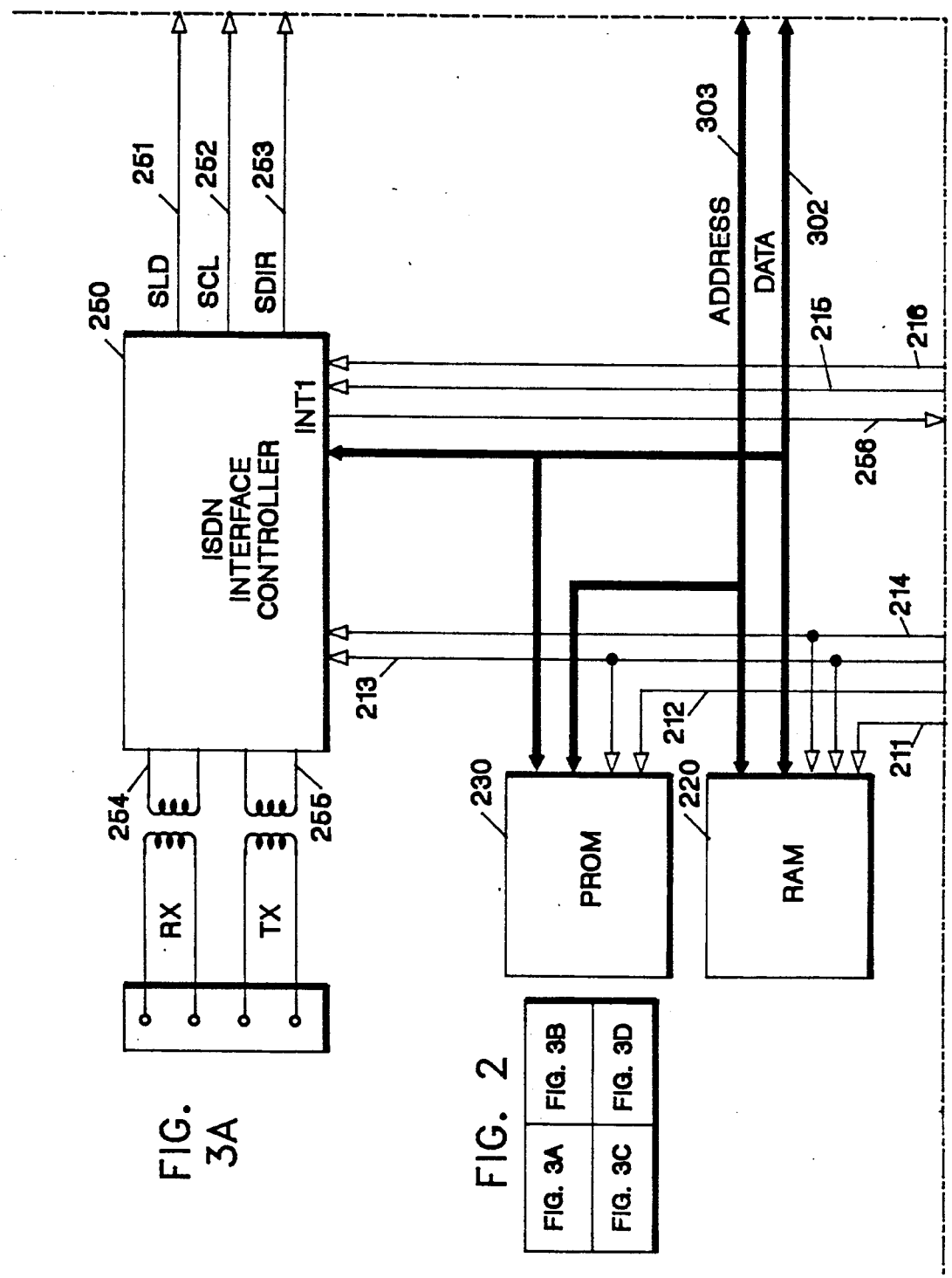

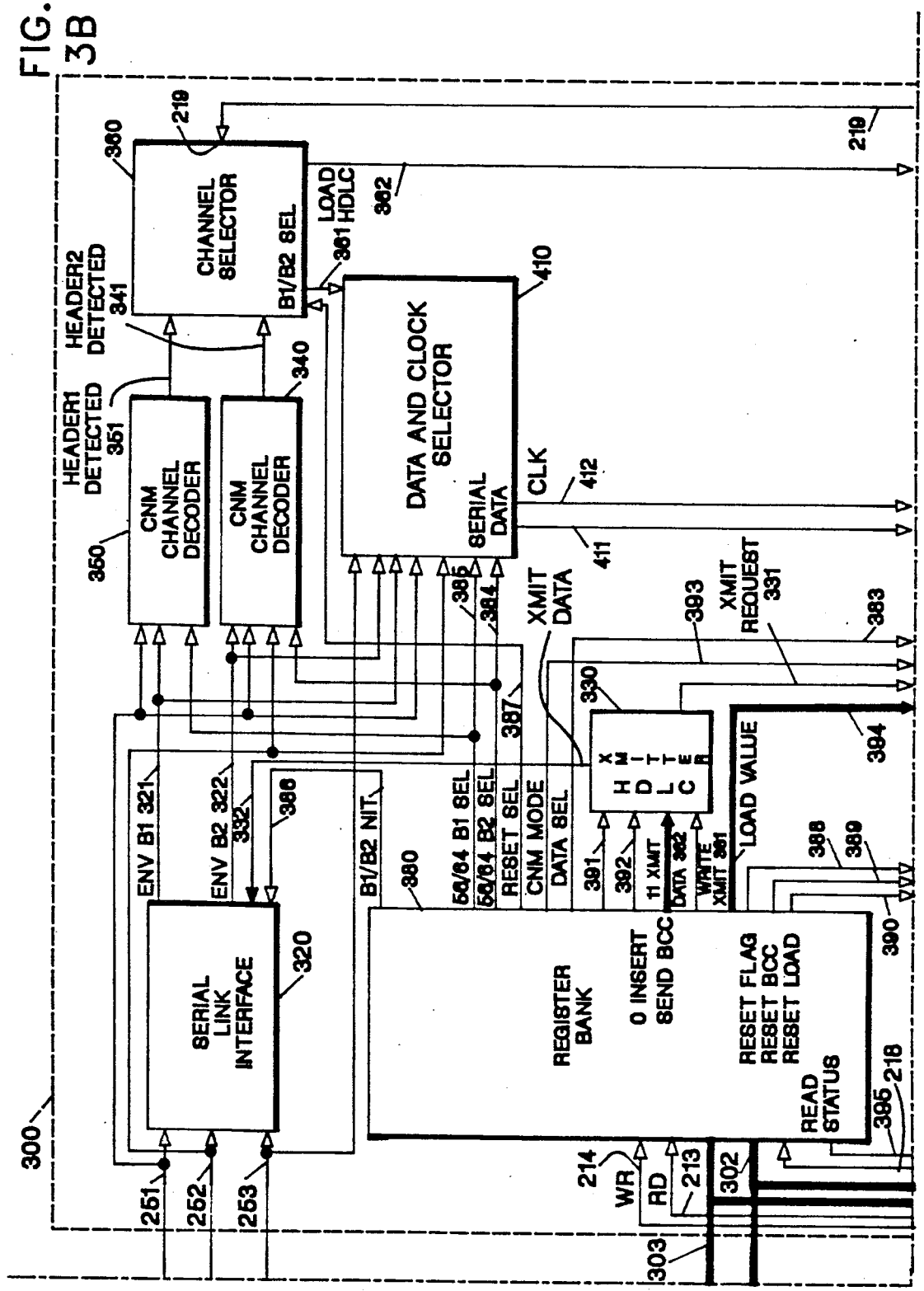

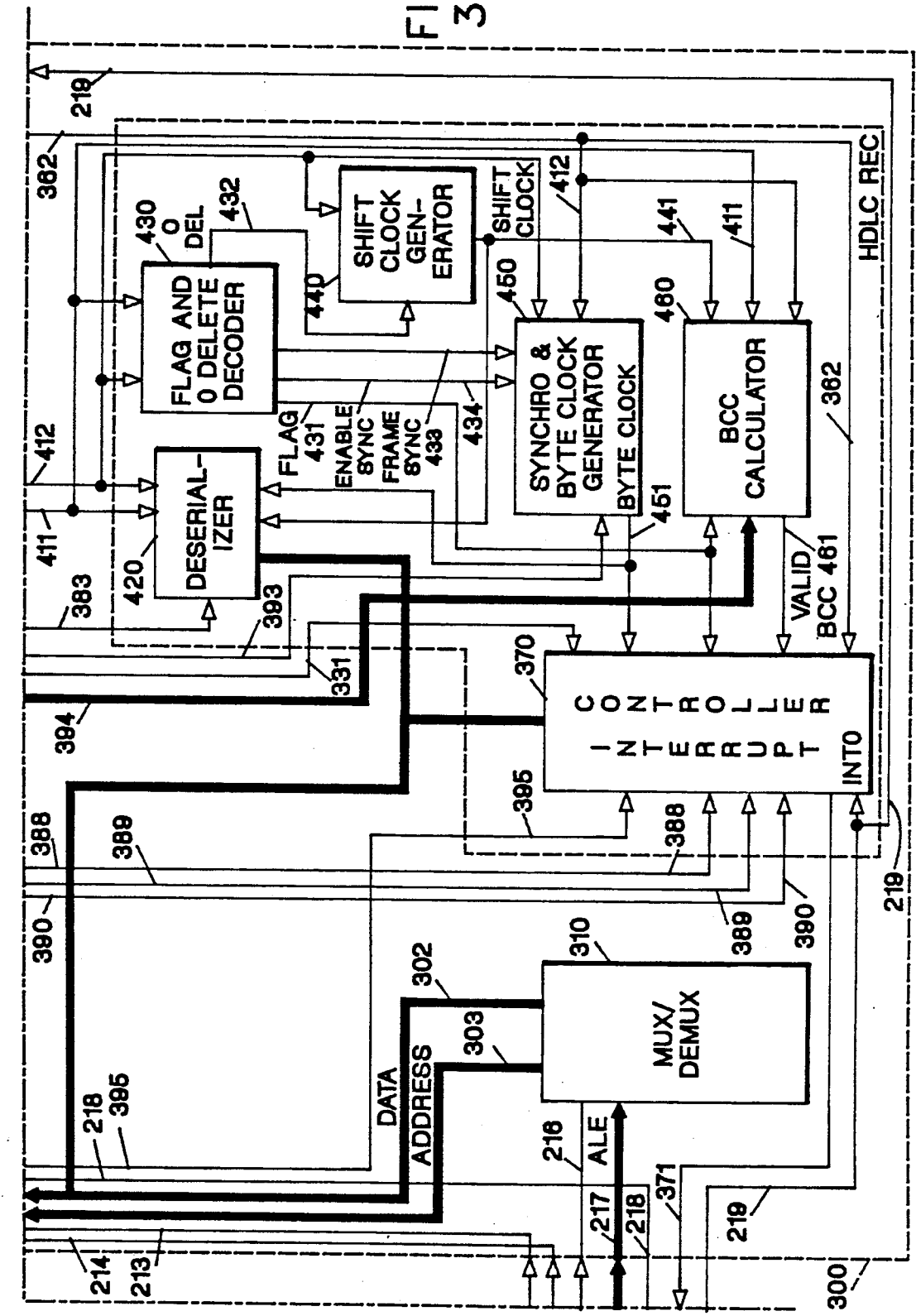

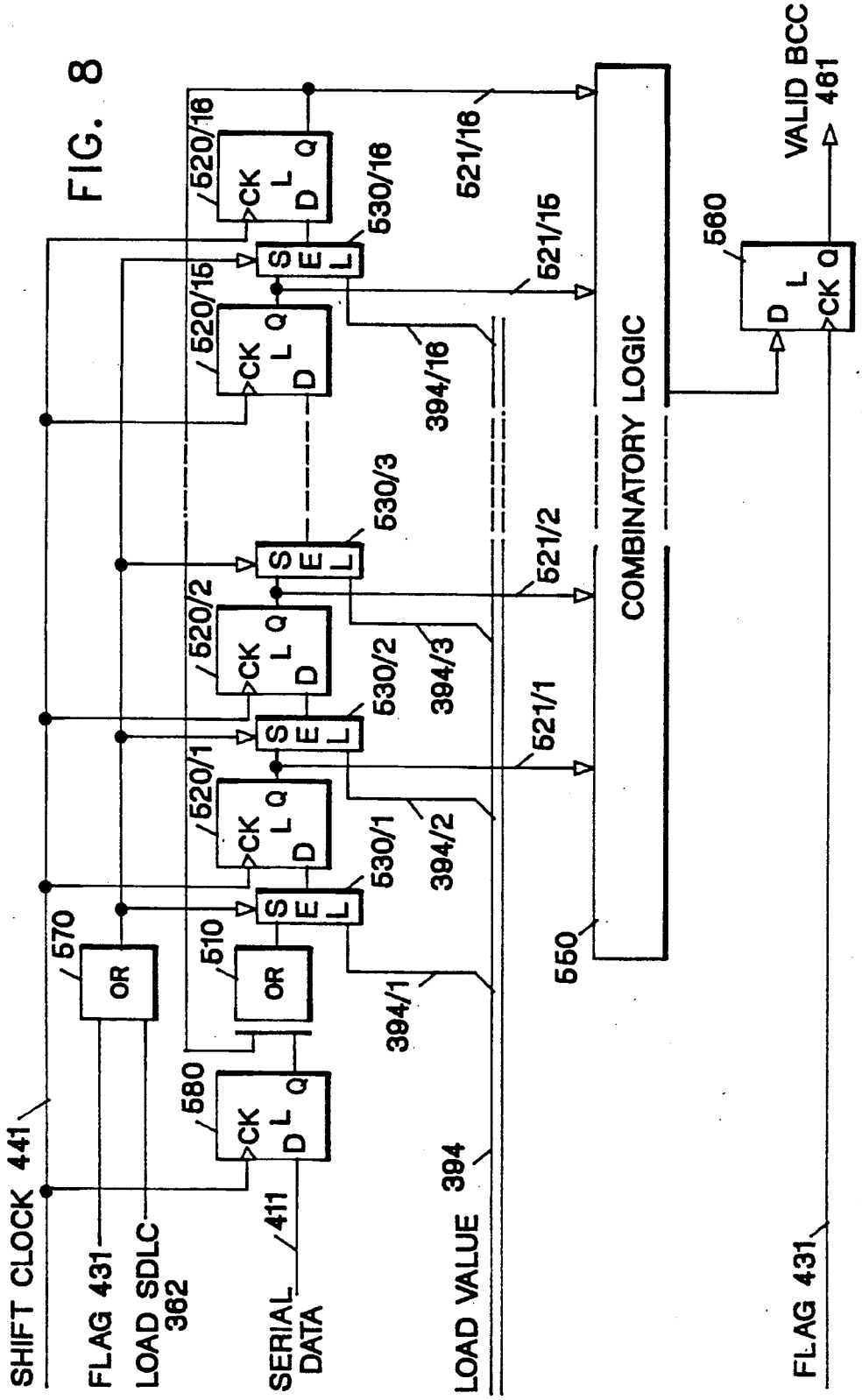

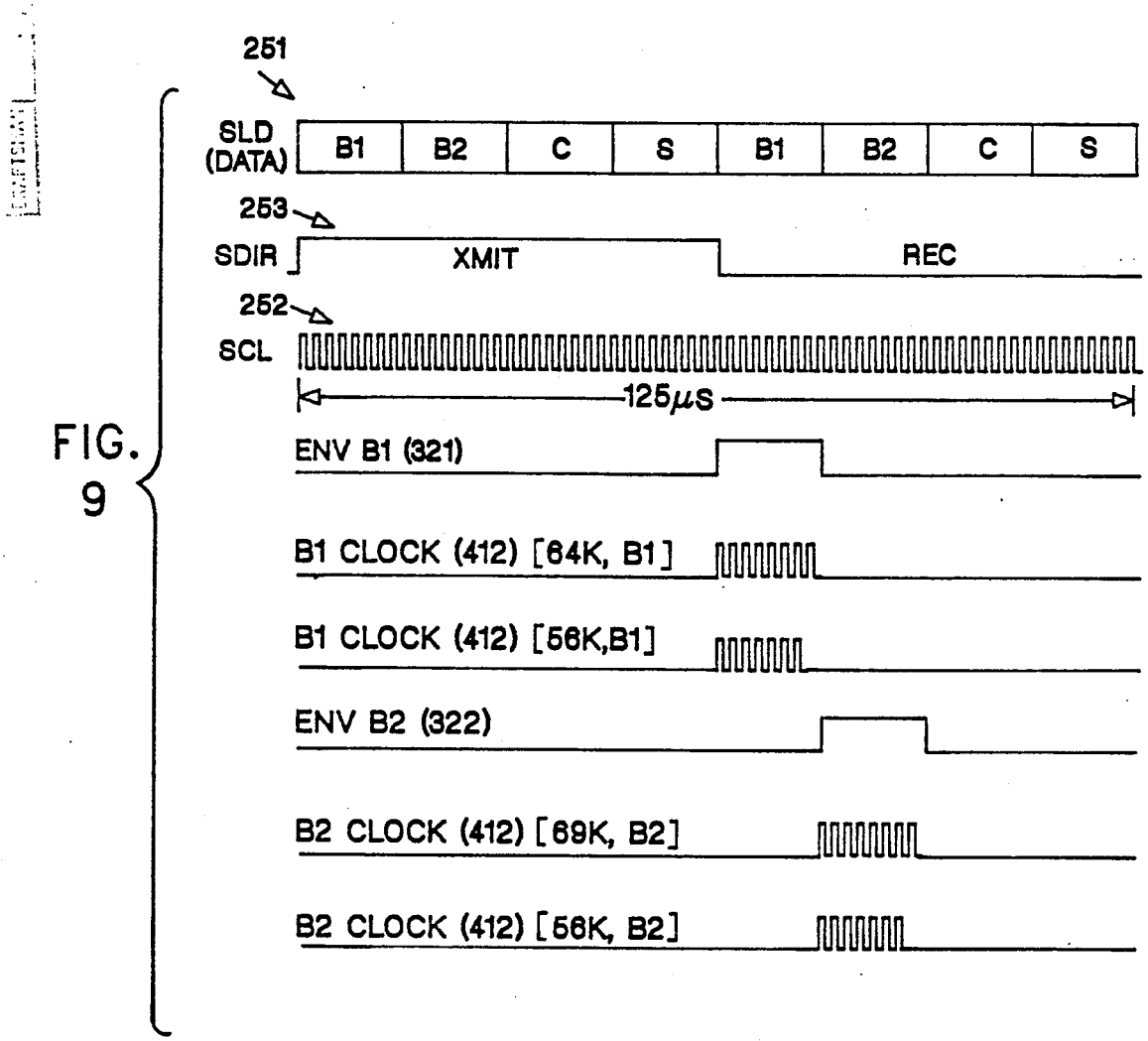

TERMINAL ADAPTER HAVING A MULTIPLE HDLC COMMUNICATION CHANNELS RECEIVER FOR PROCESSING CONTROL NETWORK MANAGEMENT FRAMES

TECHNICAL FIELD OF THE INVENTION

The present invention relates generally to a Terminal Adapter for a telecommunication network having a multiple channel HDLC communication receiver and particularly to a Terminal adapter for processing control network managment frames.

PRIOR ART

Telecommunication networks are widely spreading out, thus allowing the connection of, and the communication between, numerous equipments. The development of new applications, as well as an increasing need in communication, has entailed the necessity for telecommunication products suppliers to design products allowing higher performance in terms of Control Network Management (CNM) and in terms of number of individual accesses to the network.

Generally the control network management is performed by means of special CNM frames of data which are transmitted through the telecommunication network, and particularly through the data channels. These special CNM frames have a specific format in order to allow the distinguishing of the CNM control commands intended for the telecommunication equipments from the usual data. For synchronous protocol, such as High Data Link Control (HDLC) or Serial Data Link control (SDLC) protocols, specific HDLC and SDLC frames, herein referred to as HDLC frames with defined headers, can be used in order to provide CNM functions.

However, the advancement of new telecommunication needs continuously results in the connection of new telecommunication products to the network and the management of an everhigher number of accesses. For instance, with respect to the concept of Integrated Services Digital Networks (I.S.D.N.) resulting from the on-going process of digitization of telephone networks, the customer will be allowed to access large public telecommunication services. FIG. 1 shows the general architecture of an I.S.D.N telecommunication network such as defined by the CCITT (cf CCITT Tome II fascicule III.5). The terminating equipment is connected to a Terminal Adapter (TA) consisting of a basic 2B+D interface and a base logic controlled by a microprocessor being capable of handling data on the three channels : B1, B2 at 64 Kbps and D channel at 16 kBps.

The I.S.D.N. network particularly allows the possibility of the use of several communication channels between two Terminal Adapters (TA) connected to the network. A basic access port offers up to three data channels (2B+D) and a primary access port offers up to 30 "B" channels and one "D" channel. The providing of CNM functions on every data communication channel entails the multiplication of elementary SDLC receivers, each one providing the CNM function for a determined channel. Such a multiplication inevitably results in a correlative multiplication of the electronic components, thus increasing the manufacturing costs.

Therefore, a need has appeared for a Terminal Adapter allowing the connection of several communication channels while providing CNM functions for each. More precisely, a need has appeared in an apparatus designed to be connected to several HDLC communication channels which includes a HDLC receiver that can be shared between all the existing communication channels.

OBJECTS OF THE INVENTION

It is an object of the invention to provide an improved Terminal Adapter for a telecommunication network having a multiple HDLC receiver that can be shared between numerous HDLC communication channels.

It is a further object of the invention to provide an improved Terminal Adapter having a multiple HDLC receiver for allowing the detection of specific Control Network Frames.

SUMMARY OF THE INVENTION

The objects of the invention are achieved by means of the terminal adapter of the invention which has a multiple HDLC communication channel receiver including a BCC calculator for computing and checking the validity of a received HDLC CNM frame. The Terminal adapter further includes means for detecting the reception of a specific CNM header included in a CNM frame on one HDLC communication channel and also includes means responsive to said detection for initializing the BCC calculator to a determined state. The latter state corresponds to the state of the BCC calculator after having computed the above specific header, whereby the BCC calculator can complete the computation of the whole CNM frame including either the specific header and the CNM control command.

DESCRIPTION OF DRAWINGS

FIG. 2 is a view detailing the relationship between FIG. 3a, 3b, 3c and 3d.

FIG. 3a, 3b, 3c and 3d are partial views of the preferred embodiment of the HDLC receiver according to the invention.

FIG. 8 is a view of "BCC calculator" circuit 460.

FIG. 9 illustrates timings relating to the output signals of the ISDN interface controller 250.

DESCRIPTION OF THE INVENTION

Figure 1:
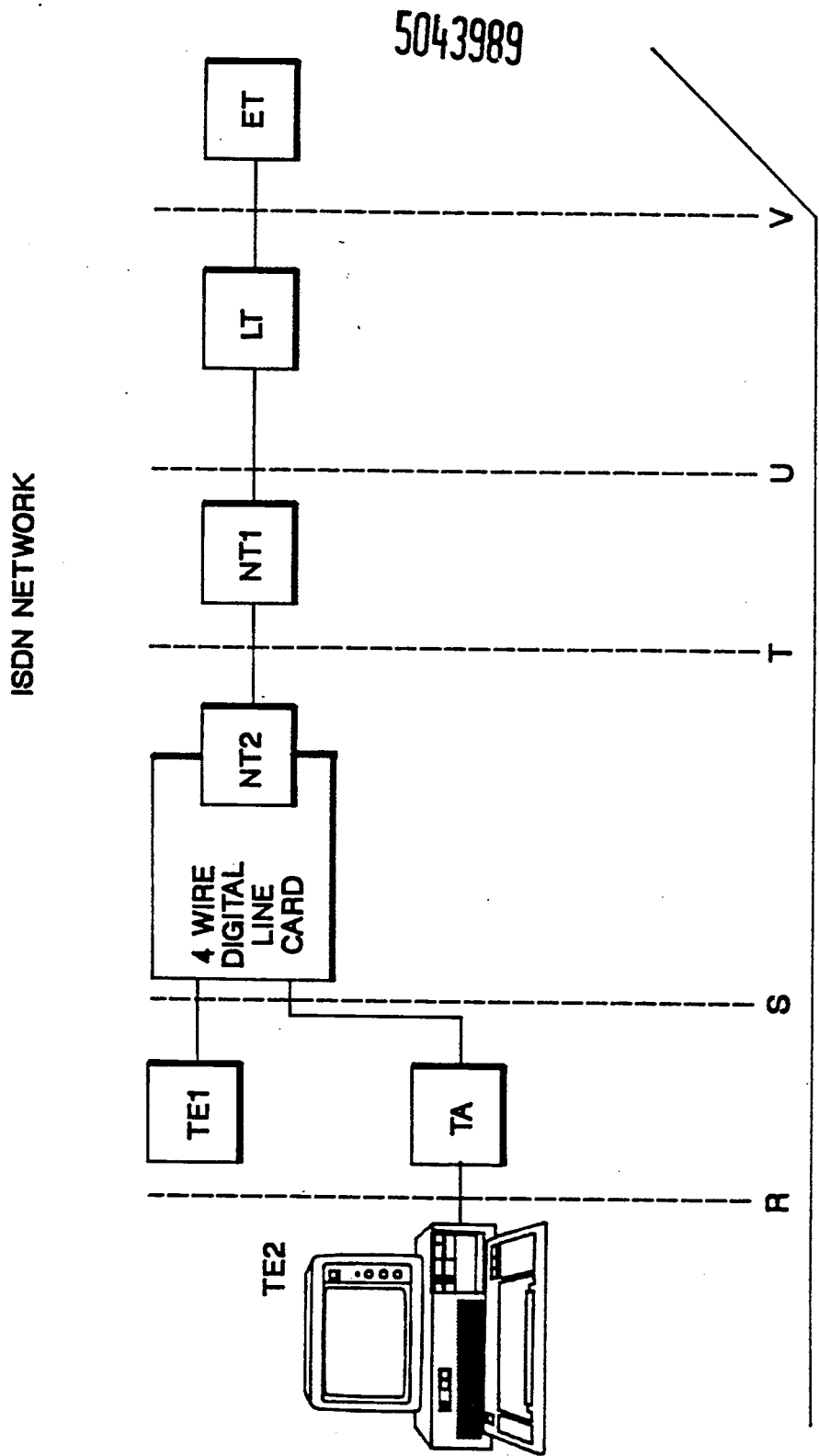
FIG. 1 shows the general architecture of telecommunication network such as defined by the CCITT.

FIG. 1 shows the general architecture of an I.S.D.N telecommunication network such as defined by the CCITT.

Figure 3C:
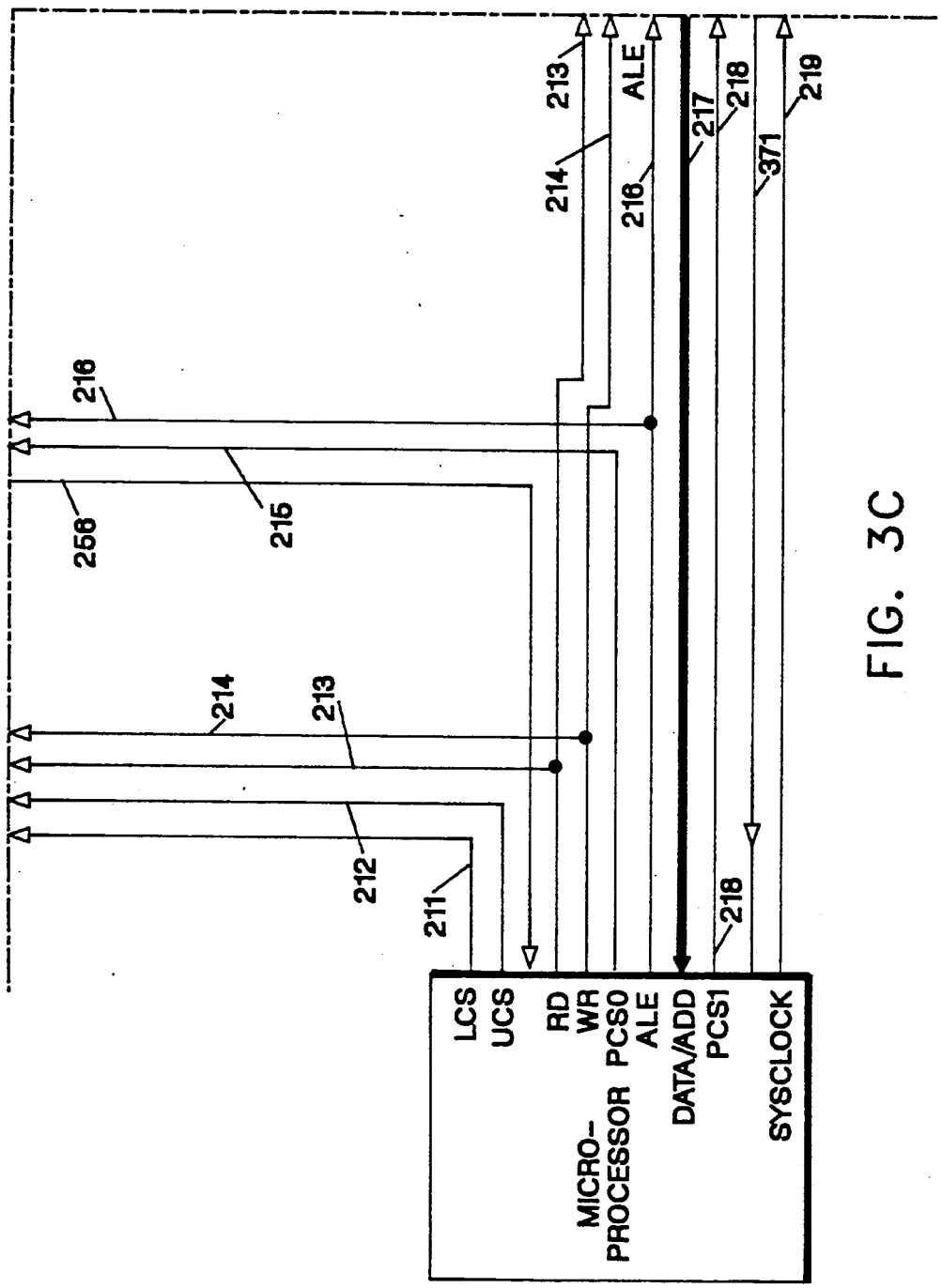

FIG. 2 is a diagram showing how to assemble the FIGS. 3a, 3b, 3c and 3d in order to provide an extensive view of the preferred embodiment of the invention. With respect to FIG. 3c, the apparatus according to the invention includes a processor 210, such as one of the 80186 Intel series, which communicates by means of a time multiplexed address and data bus 217. Time multiplexed address and data bus 217 is connected to a a multiplexor/demultiplexor 310 (FIG. 3D) providing the conventional address and data busses 302 and 303. The timing for the processing is given by a Address Latch Enable (ALE) signal 216 transmitted to multiplexor/demultiplexor 310 in order to perform the demultiplexing of bus 217 in the two separate data bus 302 and address bus 303. The apparatus according to the invention further includes memory storage elements and particularly a Programmable Read Only Memory (PROM) 230 and a Random Access Memory (RAM) 220 such as shown in FIG. 3a, both elements being respectively address able by means of a UCS chip select signal on a lead 212 and a LCS chip select signal on a lead 211. The latter memory storage elements are also addressable by address bus 302 and data bus 303 carrying an address and a data value, both being generated by the above mentioned multiplexing/demultiplexing block 310. A READ 213 signal and a WRITE 214 signal for controlling the storage memory elements are generated by processor 210.

With respect to FIG. 3a, the apparatus also includes an I.S.D.N. Interface Controller 250, of the type 29C53 marketed by INTEL CORPORATION for instance, which allows the extraction of data information received from a receive pair 254 in order to generate data in a converted form on a Serial Link Data (SLD) lead 251, according to the specifications of the INTEL Microcommunication Handbook. SLD lead 251 being bidirection al, I.S.D.N. Interface Controller 250 also extracts data received from SLD lead 251 in order to transmit it over a transmit pair 255. In addition to SLD signal, ISDN inter face controller 250 controls a Serial Clock (SCL) lead 252 and a Serial DIRection (SDIR) lead 253 connected to a Serial Link Interface 320, shown in FIG. 3b. With respect to FIG. 3a again, an I.S.D.N. connector 260 allows the connection of the apparatus to the I.S.D.N. network. The electric isolation between pairs 254 and 255 and the telecommunication network is provided by a pair of (not shown) transformers. I.S.D.N. Interface Controller 250 is controlled by microprocessor 210 by means of READ signal on lead 213, WRITE signal on lead 214, ALE signal 216 and a PCS0 signal on a lead 215 generated by processor 210. I.S.D.N. Interface controller 250 is also connected to data bus 302. I.S.D.N. Interface controller 250 is connected to processor 210 by means of an interrupt lead 256. With respect to FIG. 3b, a register bank 380 controls Serial Link Interface 320 by means of a "B1/B2 XMIT" signal on a lead 386, a "CNM Channel 1 Decoder" 350 by means of a "56/64 B1 SEL" signal on a lead 385, a CNM Channel 2 Decoder 340 by means of a "56/64 B2 SEL" signal on a lead 384 and a Data and Clock Selector 410 by means of control leads 384 and 385.

Register bank 380 is also connected to a Channel Selector 360 by a "RESET SEL" lead 387 and controls a Deserializer 420 (shown in FIG. 3d) included into HDLC receiver block 400 by means of a "DATA SEL" signal on a lead 383. Register bank 380 further controls a "SYNCHRO AND BYTE CLOCK" generator 450 by means of a "CNM" mode signal on a lead 393. Register bank 380 further controls Interrupt Controller 370 by means of a first "RESET FLAG" signal on a lead 388, by means of a second "RESET BCC" signal on a lead 389 and a third "RESET LOAD" signal on a lead 390. Block 400 also includes a BCC Calculator 460 controlled by a 16 bits "LOAD VALUE" word carried on a bus 394. At last, bank register 380 controls a HDLC Xmitter 330 by means of the following signals: a "ZERO INSERT" signal on a lead 391, a "SEND BCC" signal on a lead 392, "WRITE XMIT" signal on a lead 381 and a eight bits "XMIT DATA" word on a bus 382.

HDLC TRANSMITTER 330 performs the generation of HDLC frames. Data comes from microprocessor 210 thru mux/demux 310 and register bank 380 using write signal 214, chip selection PCS1 218 and corresponding address for the determined register on bus 303. The control of HDLC transmitter 330 is performed by means of "ZERO INSERT" signal on lead 391, "SEND BCC" signal on lead 392 and "WRITE XMIT" signal on lead 381. HDLC TRANSMITTER 330 has a first output lead 332 carrying the serial data transmitted to Serial Link Interface circuit 320 and a second output lead 331 carrying a transmit request signal on a lead 331 which is transmitted to interrupt controller 370.

SERIAL LINK INTERFACE 320 generates a first "ENV B1" signal on a lead 321 which is transmitted to a "CNM CHANNEL 1 DECODER" 350 and "DATA AND CLOCK SELECTOR" 410.

SERIAL LINK INTERFACE 320 generates a second "ENV B2" signal on a lead 322 which is transmitted to a "CNM CHANNEL 2 DECODER" 340 and "DATA AND CLOCK SELECTOR" 410. Serial link interface 320 is also able to force data coming from the HDLC TRANSMITTER 330 from a "XMIT DATA" lead 332 into the B1 or the B2 channel. The selection of B channel is achieved by means of the set of the signals on leads 321 and 322. Both signals correspond to the envelope of the data bits received on respectively B1 and B2 channels. FIG. 9 illustrates the time diagrams of 321 and 322 signals.

The two CNM channel decoders, i.e. "CNM CHANNEL 1" decoder 350 and "CNM CHANNEL 2" decoder 340, allow the detection of specific headers in the received frames in order to extract special CNM control data. As soon as the latter header is detected on one B channel, B1 channel for instance, a "HEADER 1 DETECT" signal on a lead 351 is transmitted to a channel selector module 360 as shown in FIG. 3b. Similarly, "CNM CHANNEL 2" decoder 340 generates a "HEADER 2 DECTECTED" signal on a lead 341 at the detection of the CNM header on the B2 channel. It should be noticed that the set of FIGS. 3a, 3b, 3c and 3d particularly illustrates the case of two channels, but the man skilled in the art will straightforwardly extend the description to a n-channel apparatus.

With respect to FIG. 3b and FIG. 9, the capability of sampling only seven bits out of eight in the B1 or B2 channel slot given by "ENV B1" signal on lead 321 or "ENV B2" signal on lead 322, is offered thanks to the programmable values on "56/64 B1 SEL" lead 385 and "56/64 B2 SEL" load 384 from REGISTER BANK 380. This capability is given due to the existence of 56 kbps restrictive speed of transmission over B channels provided in some I.S.D.N. Networks.

In response to a header detection signal transmitted by one of the two leads 341 and 351, CHANNEL SELECTOR 360 performs the selection of the channel which will be connected to the DATA and CLOCK SELECTOR 410 through "B1/B2 SEL" signal on a lead 361. A "LOAD HDLC" signal on lead 362 is also generated in order to preset HDLC RECEIVER block 400 so that it will be able to handle a HDLC CNM frame, the beginning of which, i.e. a specific CNM header as will be detailed hereinafter, has not been taken into account. The signal on lead 362 is also used to generate an interrupt to processor 210 thru Interrupt Controller circuit 370. In order to avoid loss of time, the clocking is driven by a a fast "SYSCLOCK" clock 219. When the frame has been totally received, processor 210 controls register bank 380 by means of busses 302 303 and control signals 214 and 216 in order to generate a "RESET SEL" signal on a lead 387. This will result in a reset of channel selector 360.

With respect to FIG. 3b again, DATA AND CLOCK SELECTOR 410 selects the data from B1 or B2 channel on the SLD lead 251 by means of the existing envelope "ENV B1" signal on lead 321 and envelope "ENV B2" signal on lead 322, as well as by means of "56/64 B1 SEL" signal 385 and "56/64 B2 SEL" signal 384. The latter signals carry an information representative of the used speed, and are detailed with respect to FIG. 9. "DATA AND CLOCK SELECTOR" 410 particularly uses the Serial Link Interface clock on "SCL" lead 252 coming from I.S.D.N. interface controller 250. The "SCL" clock is a 512 kHz clock. "DATA AND CLOCK SELECTOR" 410 further uses the above mentioned SDIR synchronisation signal on lead 253 which is a 8 kHz clock. "DATA AND CLOCK SELECTOR" 410 includes a 512 kbps/64 kbps converter which converts the sequence of data bursts at 512 kbps into a continuous sequence of data at 56 or 64 kbps on lead 411 according to "56/64 B1 SEL" signal on lead 385 and "56/64 B2 SEL" signal on lead 384. The latter converter also provides an associated 56 or 64 kHz clock signal on a lead 412.

With respect to FIG. 3d, HDLC receiver block 400 includes a deserializer circuit 420, a "Flag and Zero delete" decoder 430, a shift clock generator 440, a "Synchro and byte clock" generator 450 and a "BCC calculator" circuit 460. All of these elements will be described in detail hereinafter.

"FLAG and ZERO DELETE DECODER" circuit 430 provides the signalling of the beginning of the frame, the ending of the latter, and during this interval, the HDLC zero delete function. This is achieved by using the same inputs as for the preceeding block i.e. "SERIAL DATA" signal 411 and CLOCK 12.

"FLAG and ZERO DELETE DECODER" element 430 generates a "ZERO DEL" signal 432 which is sent to a SHIFT CLOCK GENERATOR 440, a FLAG signal 431 used by "SYNCHRO & BYTE GENERATOR" block 450 and "INTERRUPT CONTROLLER" module 370, an "ENABLE SYNCHRO" signal on a lead 434, a "FRAME SYNC" signal on a lead 433 transmitted to "SYNCHRO & BYTE CLOCK GENERATOR" 450 which function will be explained later.

"SHIFT CLOCK GENERATOR" 440 provides the conversion of the signal on lead 412 into a "SHIFT CLOCK" clock signal on a lead 441, a pulse of which being suppressed whenever a zero delete appears. The clock signal on lead 441 is used by all the functions of the HDLC RECEIVER 400 except the Flag and Zero Delete Decoder 430.

"SYNCHRO and BYTE CLOCK GENERATOR" 450 uses the clock signal existing on lead 412 in order to generate a "BYTE CLOCK" signal 451. As will be described hereinafter, on a normal frame operation the Byte Clock generation is gated by the "flag and zero delete" decoder 430 thru ENABLE SYNCHRO signal on lead 434 and FRAME SYNC signal on lead 433. However, in the case of a partial frame loading, the loading is performed by "LOAD HDLC" signal generated on lead 362. The "Byte clock" signal on lead 451 is used to control DESERIALIZER circuit 420 and is also used to generate an interruptthrough to microprocessor 210 through INTERRUPT CONTROLLER 370 and by means of INTO interrupt lead.

HDLC receiver circuit 400 further includes a BCC CALCULATOR circuit 460 which is, in the preferred embodiment of the invention, a 16 bits CCITT V 42 scrambler for HDLC frames. The latter circuit, as will be seen later on, is able to be loaded with different values and at different times according to the nature, being complete or partial, of the frame to be checked. "BCC calculator" circuit is connected to lead 411 carrying the serial data and is clocked by means of the already mentioned SHIFT CLOCK 441. In the case of full frames, FLAG signal on lead 431 generates the loading of latches included into "BCC calculator" circuit 460 in order to perform the checking of the integrity of the frame. In case of CNM frames where the beginning of the frame is missing, "LOAD HDLC" lead 362 is used in order to perform the loading. At the end of the frame, and if the checking is successful, a "VALID BCC" signal appears on a lead 461 and is transmitted to processor 210 by means of INTO lead 371 thru INTERRUPT CONTROLLER circuit 370.

INTERRUPT CONTROLLER 370 performs an OR function of XMIT REQUEST signal on lead 331, "FLAG" signal on lead 431, "LOAD HDLC" signal on lead 362, "VALID BCC" signal on lead 461 and "BYTE CLOCK" signal on lead 451. A status is available on data bus 302 by selection of READ STATUS 395 coming from the REGISTER BANK 380. "BYTE CLOCK" signal on lead 451 and "XMIT REQUEST" signal on lead 331 are pulsed signals so that no reset is required. The state of "FLAG", "VALID BCC" and "LOAD HDLC" signals on leads 431, 461 and 362 is memorized in latches included into interrupt controller 370. The control of register bank 380 by means of processor 210 allows the generating of three reset signals for resetting the latter latches: "RESET FLAG" signal on a lead 388, "RESET BCC" signal on a lead 389 and "RESET LOAD" on a lead 390. Let us assume that a synchronous protocol is used on both B channels. Assuming also that an HDLC frame is transmitted for CNM purpose, the terminal adapter (TA) connected to the telecommunication network has to extract and process the CNM control information. As mentioned above, CNM frame is characterized by a a specific header intended to be recognized by the terminal adapter but not by the Data Terminating Equipment (DTE). The HDLC or SDLC protocol requires a 10 byte specific header in order to distinguish a CNM control information from non CNM control information, i.e. data information transmitted from one DTE to an other DTE. In the preferred embodiment of the invention, the CNM frame has the following format:

| 7E | H0 H1 H2 H3 H4 H5 H6 H7 H8 H9 | D0 D1 D2 ... DN | C1 C2 | 7E |
|---|---|---|---|---|
| Flag | CNM HEADER (10 bytes) | CNM DATA | CRC | Flag |

It should be noticed that the latter frame is an usual HDLC or SDLC frame with no zero insertion on Flag "7E", with zero insertion for the header, data and CRC. According to the HDLC or SDLC protocol, the CRC stands for the checking character used to verify the integrity of the whole frame; the evaluation of the CRC involves a calculation step with a specific polynom of the sequence of data beginning by the byte "H0" and ending by the byte "DN". The CRC processing results in a CRC value consisting of a set of two bytes: C1 and C2.

The apparatus according to the invention first checks the header of every HDLC frame in order to recognize the CNM header by means of "CNM channel 1" 350 or "CNM channel 2" decoders 340. Whenever the latter CNM header is detected, the apparatus performs two distinctive steps: a first step consists in loading the sequence of data D0 . . . DN in RAM element 220 by means of processor 210. The man skilled in the art may also use a mechanism of the type Direct Memory Access (DMA) mechanism in order to load the above sequence of data.

A second step consists in a loading of the latches included into "BCC calculator" element 460 by means of "LOAD VALUE" bus 394. The complete mechanism of this loading will be described hereinafter with respect to the description of FIG. 8. Shortly, "LOAD VALUE" bus 394 carries a 16 bits word which value corresponds to the value that the output of the 16 latches included into "BCC CALCULATOR" 460 would have had if the latter "BCC CALCULATOR" 460, which remains non operating until the detection of the CNM header i.e. the reception of the last byte H9, had started computing at the reception of the first data H0 of the CNM header. The above mentioned value that is carried by "LOAD VALUE" bus 394 in order to set a determined value into the latches included into "BCC CALCULATOR" 460 is given by "Register bank" 380. In the preferred embodiment of the invention, the chosen value is 1000001010000000. The latter corresponds to the following CNM header that has been chosen in the preferred embodiment of the invention: FD 1B 28 80 10 42 08 21 84 10.

In the preferred embodiment of the invention, the CNM header comes in on a B channel at a speed of 64 kilobits per second. Data are carried on the bidirectional serial link SLD 251 which is clocked by SCL 252, and the way of the communication being determined by means of the information carried by SDIR 253.

These 3 signals are characteristics of the I.S.D.N. serial communication protocol These are transmitted, as shown in FIG. 3b, to SERIAL LINK INTERFACE circuit 320 which includes, in the preferred embodiment of the invention, a counter (not shown) synchronized by SDIR 253 and clocked by SCL 252. The decoding of appropriate states of this counter allows the generation of a first B1 envelope signal on lead 321 representative of the presence of data relative to B1 channel on SLD lead 251, and a second B2 envelope signal on lead 322 which is representative of the presence of data relative to B2 channel on SLD lead 251, such as shown in FIG. 9.

The detection of the CNM header on B1 channel (resp. B2 channel) is performed by "CNM channel 1" decoder 330 (resp. "CNM channel 2" decoder 340) including a binary counter. which is incremented when an expected byte included in the CNM header pattern appears, and which is cleared whenever any difference between an expected byte and the actual incoming byte occurs. The clocking is provided by a signal coming from SCL clock signal on lead 252 which is ANDed with the envelope signal on lead 321 (resp. 322). Whenever, the state of the counter corresponds to the length of the expected CNM header, this state is decoded in order to generate the "HEADER 1 DETECTED" signal on lead 351 (resp. "HEADER 2 DETECTED" signal on lead 341).

The output of the latter "CNM channel 1" decoder 330 and "CNM channel 2" decoder 340 is connected to "CHANNEL SELECTOR" circuit 360, the purpose of which being the selection of the B channel into "DATA and CLOCK" selector 410 by means of "B1/B2 sel" signal on lead 361 which will be transmitted to the receiver 400.

Figure 4:
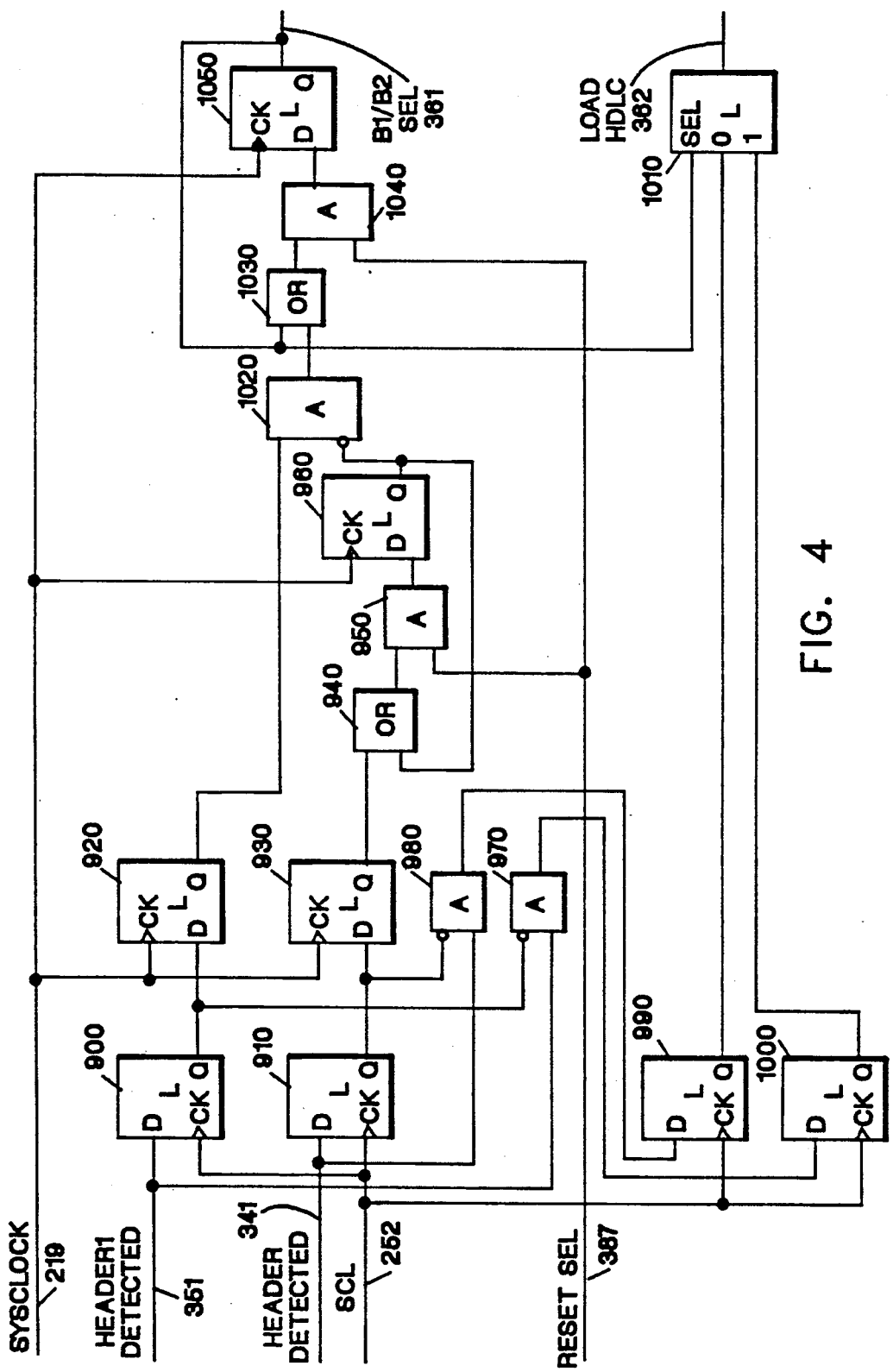
FIG. 4 is a detailed view of the "Channel Selector" circuit 360 of the invention.

"CHANNEL SELECTOR" circuit 360 is particularly described with respect to FIG. 4.

"HEADER 1 DETECTED" signal existing on lead 351 is sampled by means of a D-latch 900 which is clocked by SCL signal on lead 252. Then, the output of the latter D-latch is resampled by means of a D-latch 920 which is clocked by the above mentioned "SYS-CLOCK" clock signal existing on lead 219, the latter clock signal being a speed clock of 8 megahertz in the preferred embodiment of the invention. The Q output of latch 920, carrying the result of the double sampling of the signal on lead 351 is connected to the noninverting input of an AND gate 1020, the inverting input of which being connected to the Q output of a D-latch 960. D-latch 960 is clocked by the signal on lead 219 and has its D input connected to a AND gate 950.

Lead 351 is connected to a non inverting input of a AND gate 970 which inverting input is connected to the Q output of latch 900. The output of AND 970, being an up transition at the detection of the header on channel B1, is latched by a D-latch 1000 which is clocked by SCL signal on lead 252 in order to delay the up transition.

Similarly, "HEADER 2 DETECTED" signal on lead 341 is sampled by a D-latch 910 clocked by SCL signal on lead 252. The output of the latter latch is then resampled a D-latch 930 which is clocked by "SYS-CLOCK" clock signal on lead 219. The output of latch 930, carrying the result of this double sampling is connected to a first input of a OR gate 940, a second output of which being connected to Q output of latch 960. The output of OR gate 940 is connected to an input of an AND gate 950, a second input of which being connected to "Reset sel" signal on lead 387 and the output of which being connected to the D input of latch 960. The Q output signal of latch 960 is transmitted back to the second input of OR gate 940 so that a set-reset function is achieved. The output of latch 960 is connected to the inverting input of AND gate 1020. Furthermore, "Header 2 detected" signal on lead 341 is transmitted to a non inverting input of an AND gate 980, the inverting input of which being connected to the Q output of latch 910. The output of AND 980 provides an up transition pulse when a header is detected on channel B2 which is latched by a D-Latch 990 clocked by SCL clock on lead 252 in order to delay this up transition.

The output of latch 920 and the output of latch 960 are respectively connected to a non inverting input and an inverting input of an AND gate 1020. The output of AND 1020 is connected to a first input of an OR gate 1030, a second input of which being connected to the Q output of a D-latch 1050 which is clocked by means of the "SYSCLOCK" signal on lead 219. The D-input of D-latch 1050 is connected to the output lead of an AND gate 1040 having a first input connected to lead 387 and a second input connected to the output of OR gate 1030. The association of OR gate 1030, AND gate 1040 and latch 1050 makes up a set-reset flip-flop. Latch 1050 is thus able to memorize the first header detected. The reset of latch 1050 is provided by a reset signal on "RESET SEL" lead 387. The output of latch 1050 eventually provides the above mentioned "B1/B2 SEL" signal on lead 361. Lead 361 is connected to a control input of a selector 1010 having two inputs connected respectively to Q output of latch 990 and the Q output of latch 1000. Output of latch 1000 is selected, i.e. is connected to the output lead 362 of selector 1010 whenever lead 361 carries a 1. On the reverse case, the output of latch 990 is selected and the value of latch 990 is transmitted to lead 362. The output of selector 1010 carries, on lead 362, the "LOAD HDLC" signal which is a 512 kHz pulse corresponding to the period of the SCL clock signal on lead 252. The latter pulse may occur during active states of ENV B1 signal on lead 321 or ENV B2 signal on lead 322, according to the value carried by "B1/B2 SEL" lead 361.

An up transition of the signal on lead 362 generates an interruption to microprocessor via INT0 lead 371 in order to inform processor 420 of the appearance of CNM data on one B channel.

After having been selected, serial data 411 and the clock 412 are presented to the HDLC RECEIVER 400. Each channel has its header detection but there is only one HDLC receiver circuit 400. Thus, a CHANNEL SELECTOR 360 has been implemented to memorize on which channel the first header has been detected No contention is possible for the detection due to the time multiplexing of data on SLD bus. Implemented logic is locked on the first channel where a header is found until reset of the microprocessor 210 through RESET SEL 387. Note that RESET SEL 387 signal is a zero-active signal.

Figure 5:
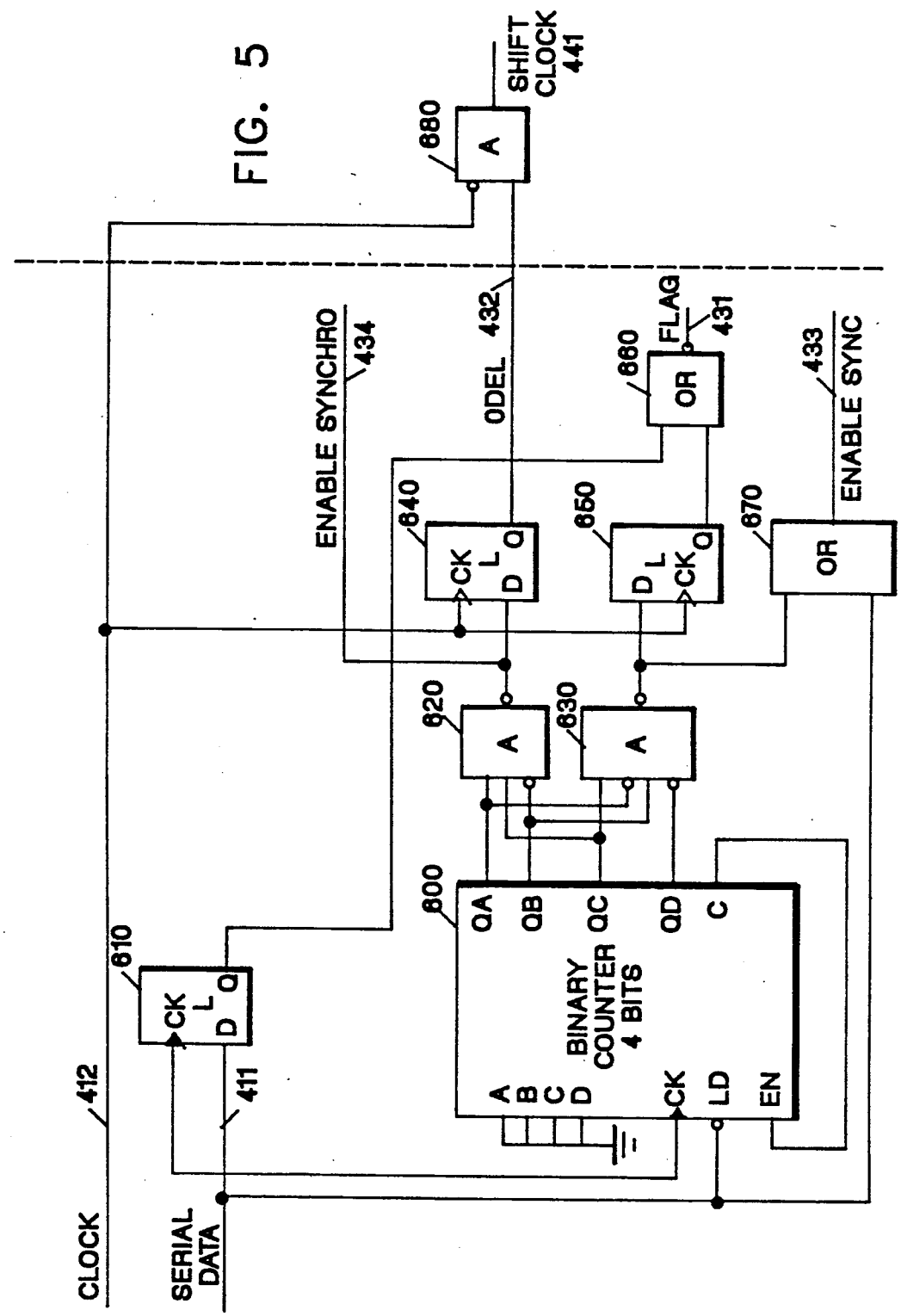
FIG. 5 is a shematic view of "Flag and Zero delete" decoder 430 and "Shift clock generator" circuit 440.

"FLAG AND ZERO DELETE" decoder 430 and SHIFT CLOCK GENERATOR. 440 are described with respect to FIG. 5.

"FLAG AND ZERO DELETE" decoder includes a set of latches: 610, 640, 650 and also the latches included into a counter 600. All latches are clocked by "CLOCK" signal on lead 412. Counter 600 is a binary counter of the type 74 LS 163 which is synchronized by the serial data 411 transmitted to its LOAD input. Counter 600 is also clocked by "CLOCK" signal 412. The four A, B, C, D load inputs are set to zero. Thus, counter 600 starts counting on the first zero encountered on serial data 411. In an HDLC transmission, a flag is a succession of 6 ones. Any zero state on lead 411 clears counter 600, and only 6 following ones followed by a zero will be taken as a flag. This is done by a decoding of state "6" by a 4 input NAND gate 630, having a first noninverting input which is connected to QC output of counter 600. NAND gate 630 has a second input connected to QA output of counter 600, a third non inverting input connected to QB output of counter 600 and a fourth inverting input connected to QD output of counter 600. The above mentioned decoding of state "6" of counter 600 is confirmed through 1 delay in order to make sure of the presence of a "ZERO" following the sequence of six "ONE" by means of a latch 610 which input is connect ed to serial data lead 411. Both Q outputs of latches 610 and 650 are connected to the 2 inputs of a NOR gate 660. The output of 660 is called FLAG 431.

It is well known by the man skilled in the art that in HDLC transmission, data is differentiated from a flag by inserting a zero after every 5 ones. The same binary counter 600 is used and the state 5 is decoded by a 3 inputs NAND gate 620. The latter NAND gate 620 has a first non inverting input which is connected to QA output of counter 600, a second non inverting input which is connected to QC output of counter 600 and a third inverting input which is connected to QB output of counter 600 The output of the latter NAND gate is a "ENABLE SYNCHRO" signal on a lead 434. The decoding by NAND gate 620 is then delayed by a Latch 640, the output of which being a "ZERO DEL" signal on lead 432.

"ZERO DEL" signal on lead 432 is transmitted to the SHIFT CLOCK GENERATOR 440 consisting of a AND gate 680 which noninverting input is connected to "ZERO DEL" lead 432 and which inverting input is connected to CLOCK lead 412. The output of AND gate 680 is a "SHIFT CLOCK" signal on lead 441 which is a 64 kHz clock signal resulting from "CLOCK" signal existing on lead 412 but differing from the latter by the lack of one pulse whenever lead 432 is at a low level.

Block 430 further includes an OR gate 670 having a first input connected to "SERIAL DATA" lead 411 and a second input connected to the output of NAND gate 630. The output of OR gate 670 is a "FRAME SYNC" signal on a lead 433.

Figure 6:
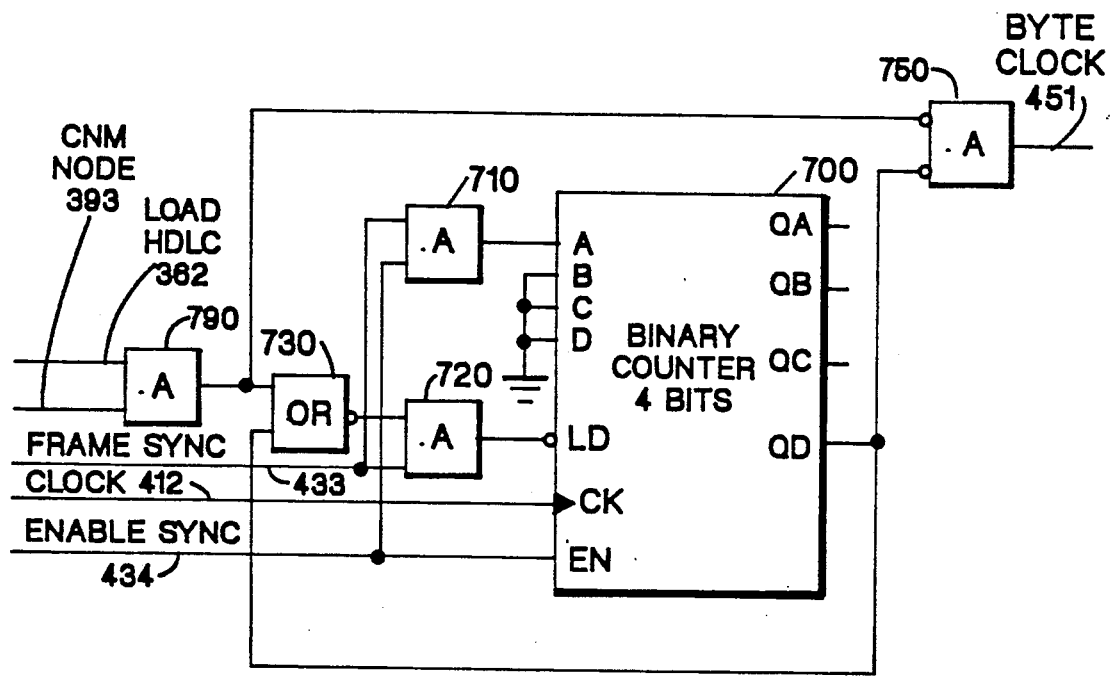
FIG. 6 illustrates the "Synchro & byte clock generator" circuit 450.

"SYNCHRO & BYTE CLOCK GENERATOR" circuit 450 is described with respect to FIG. 6. The latter circuit 450 includes a 4-bits binary counter 700 of the same type of counter 600. Counter 700 is clocked by "CLOCK" signal 412. The Enable input of counter 700 is connected to "ENABLE SYNCHRO" lead 434. B, C, D inputs of counter 700 are set to zero and A input lead is connected to the output of an AND gate 710 which has a first input connected to ENABLE SYNCHRO lead 434 and a second input connected to FRAME SYNC lead 433. LOAD (LD) inverting input of counter 700 is connected to the output of an AND gate 720 which has a first input connected to "FRAME SYNC" lead 433 and a second input connected to the output of a NOR gate 730 NOR gate 730 has a first input connected to the QD output of counter 700 and a second input connected to the output of an AND gate 740, a first input of which is connected to "LOAD HDLC" lead 362 and a second input of which is connected to "CNM MODE" lead 393 QD output lead of counter 700, representing the state "8" when active, is connected to the inverting input of an AND gate 750 which also has a second inverting input connected to the output of AND gate 740. AND gate 750 has an "BYTE CLOCK" output carrying a 8 khz signal which provides the byte synchronization over serial data lead 411 after the flag detection. The latter signal is also used to generate an interrupt to processor 210 through interrupt controller 370, so that processor 210 performs a READ operation of data bus 302 carrying the deserialized data provided at the output of DESERIALIZER 420.

Figure 7:
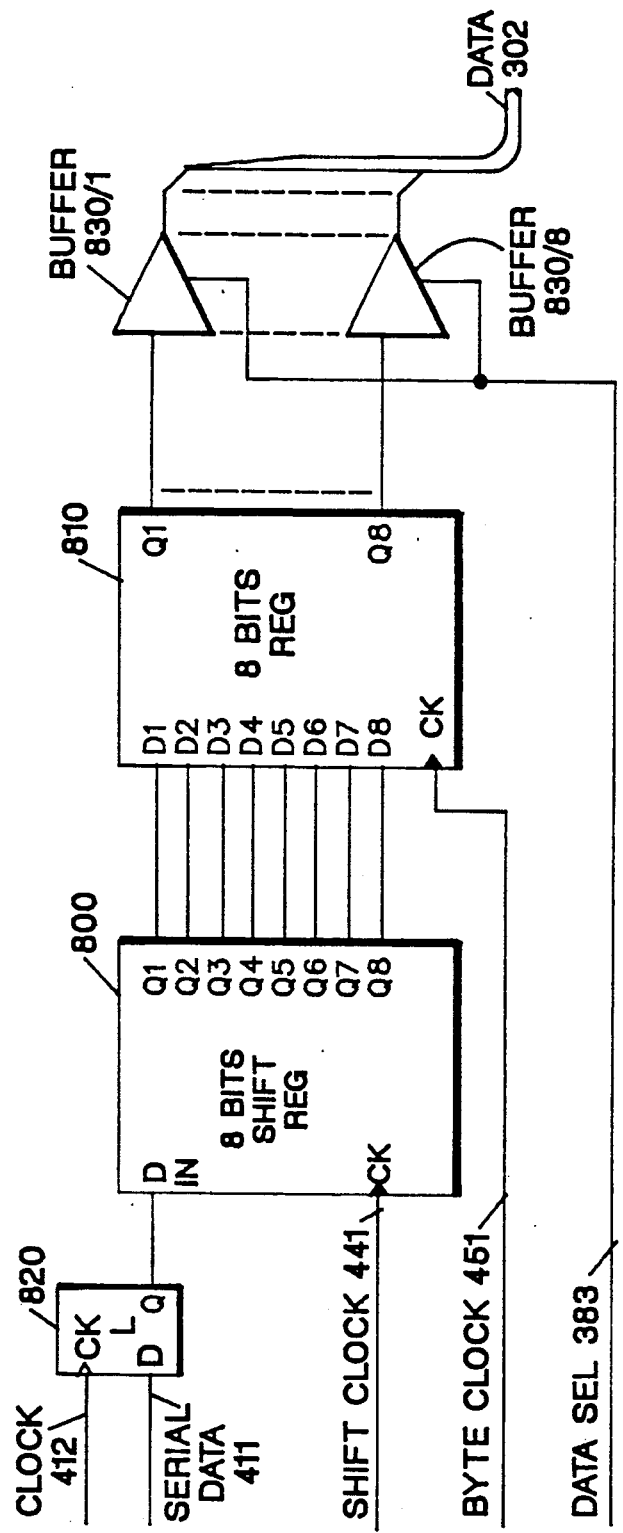
FIG. 7 is a detailed view of Deserializer circuit 420.

DESERIALIZER element 420 is particularly shown with respect to FIG. 7. DESERIALIZER 420 includes a latch 820 clocked by "CLOCK" signal on lead 412 for sampling the serial data appearing on lead 411. The output of latch 820 is connected to the input of a 8 bit shift register 800 which is clocked by "SHIFT CLOCK" on lead 441. The 8 output bits of the latter shift register 800 are latched into a 8 bit register 810 by means of the "BYTE CLOCK" signal 451 The output bits of register 810 can be read by processor 210 on DATA bus 302. To achieve this 8 tri-state buffers 830/1 to 830/8 are inserted between the output of 8-bit register 810 and data bus 302. Processor 210 performs the above READ operation after having addressed the register bank 380 in order to validate "DATA SEL" lead 383, what eventually entails the transmission of the deserialized data to data bus 302.

The BCC CALCULATOR 460 is particularly described with respect to FIG. 8. It includes a V.42 CCITT scrambler, commonly known as a CRC checker and designed to process the serial flow of data. It generally involves a computing mechanism based upon a a polynomial value in order to perform a Cyclic Redundancy Checking (CRC), the result of which being a Block Check Character (BCC) also called Frame Check Sequence (FCS) This BCC characterizing the integrity of the data flow is available at the output of a series of 16 latches 520/X (X varying between 1 to 16), each latch being clocked by "SHIFT CLOCK" signal on lead 441. The output lead 521/X (X=1 to 16) of each latch 520/X (X=1... 16) is connected to a Combinatory logic 550, the output of which being connected to the input of a D-latch 560. The input of each latch 520/X (X=2 to 16) is connected to the output of a corresponding selector 530/X (X=2 to 16). Each latter selector has a first input lead 394/X (X=2 to 16) coming from "LOAD VALUE" bus 394 and a second input connected to the output of latch 520/(X−1) (X=2 to 16).

The input of latch 520/1 is connected to the output of a selector 530/1 having a first input connected to the output of a XOR gate 510 and a second input connected to the first lead 394/1 of "LOAD VALUE" bus 394.

Each selector 530/X (X=1 to 16) is controlled by the output lead of OR gate 570 having a first input connected to "FLAG" lead 431 and a second input connected to "LOAD HDLC" lead 362.

XOR gate 510 has a first input connected to the output of latch 520/16 and a second input connected to the output lead of a latch 580 clocked by "SHIFT CLOCK" lead 441. The latter latch has an input lead connected to "SERIAL DATA" lead 411. Latch 560 is clocked by "FLAG" clock signal on lead 431 and has an Q output lead 461 indicating the detection of a valid BCC.

The general operating, and particularly that of "BCC CALCULATOR" 460 is the following:

Assuming the apparatus operates in a HDLC communication session. When a CNM control command is transmitted over the telecommunication network to the terminal adapter including the present apparatus according to the invention, for instance over B1 channel, "CNM CHANNEL 1" decoder 350 raises "HEADER 1 DETECTED" lead 351 upon reception of the last byte H9 of the CNM header. "CHANNEL SELECTOR" circuit 360 switches "DATA & CLOCK SELECTOR" circuit 410 so that serial data lead 411 carries the data coming from the B1 channel associated with the appropriate clock on lead 412 according to the state of "56/64 B1 SEL" lead 385.

"CHANNEL SELECTOR" circuit 360 also allows, with "LOAD SDLC" signal on lead 362, the generation of byte synchronization given by "SYNCHRO & BYTE CLOCK GENERATOR" circuit 450 through "BYTE CLOCK" lead 451. Circuit 360 further provides the loading of the value carried by "LOAD VALUE" bus 394 into latches 520/1 to 520/16 included into "BCC CALCULATOR 460" by means of "LOAD HDLC" signal on lead 362 controlling the serie of selectors 530/1 ... 530/16. The value on bus 394 corresponds to the value that would have been stored into the series of latches 520/1, ..., 520/16 if the serial data on lead 411 coming from "DATA & CLOCK SELECTOR" 410 had been transmitted to BCC CALCULATOR 460 since the beginning of the frame i.e. the reception of H0 byte. Therefore, the HDLC receiver 400, and particularly the latches included into the circuit 460, are set to a predefined state as if they had been dedicated to the B1 channel since the beginning of the frame, i.e. the first byte H0 of the CNM control frame. The latter predefined state of "BCC CALCULATOR" 460 after the above setting is such that the serie of latches 520/X is loaded with the above mentioned 16-bit-word 1000001010000000. The predefined stat of "BCC CALCULATOR" 460, at the reception of the last byte of the specific CNM header is therefore the state of the same BCC calculator which has computed the sequence of 10-bytes of the specific CNM header.

This allows the sharing of the same HDLC receiver 400 between several data B channels.

FIG. 9 particularly describes some timing diagrams, and particularly timings relating to output signals of ISDN interface controller 250. It consists of a timing diagram of B2 channel. CLOCK 412 output of block 410 could be one of the following depending on the selection B1/B2 SEL 361, 56/64 B1 SEL 385 and 56/64 B2 SEL 384. B1 CLOCK 412 is a burst of SCL delimited in time by ENV B1; it is used to shift the data included in this slot. B2 CLOCK 412 is a burst of SCL delimited in time by ENV B2; it is used to shift the data included in this slot.

We claim:

1. Terminal adapter for a telecommunication network having a receiver (400) for multiple HDLC communication channels, said receiver including a BCC calculator (460) for computing and checking the validity of a received HDLC CNM frame, said terminal adapter being characterized in that it further includes:

means (340, 350, 360) for detecting the reception of a specific CNM header included in a CNM frame on any one of said HDLC communication channels; and means (394, 530/X) responsive to said detection for setting said BCC calculator (460) to a predefined state, said state corresponding to the state of said BCC calculator (460) after a computation of BCC for said specific CNM header, whereby said BCC calculator (460) can proceed with computation of said BCC for said CNM frame.

2. Terminal adapter according to claim 1 characterized in that said detecting means further includes:

a first CNM channel decoder (350) for detecting the reception of said specific CNM header in a first HDLC channel; and a second CNM channel decoder (340) for detecting the reception of said specific CNM header in a second HDLC channel; and means (360) for determining which of said first and second decoder has detected the occcurence of said specific CNM header; and said terminal adapter further including:

means (410, 411) responsive to said determination for transmitting the flow of data from said first and second HDLC channels in which said specific CNM header occured, to said set BCC calculator (460).

3. Terminal adapter according to claim 2 characterized in that said BCC calculator (460) further includes:
a set of latches (520/X) for storing elementary intermediary results involved in the computation of said BCC; and
a set of selectors (530/X), each of said selectors being connected to one of said latches, said selectors allowing the loading of a predefined state into the corresponding latches whereby said BCC calculator (460) can proceed with the computation of said BCC for said CNM frame.

4. Terminal adapter according to claim 3 characterized in that said telecommunication network is a Integrated Services Digital Network and said HDLC communication channels are 64 kbps B-channels.

5. Terminal adapter according to claim 4 characterized in that said specific header is the hexadecimal sequence: FD 1B 28 80 10 42 08 21 84 10.

* * * * *